United States Patent [19]
Theobald et al.

[11] Patent Number: 6,012,535
[45] Date of Patent: Jan. 11, 2000

[54] MOUNTING ARRANGEMENT FOR A RIPPER SHANK

[75] Inventors: Michael R. Theobald, Princeville; William H. Zimmerman, Edelstein, both of Ill.

[73] Assignee: Caterpillar Inc., Peoria, Ill.

[21] Appl. No.: 09/213,596

[22] Filed: Dec. 17, 1998

[51] Int. Cl.⁷ .................................................. A01B 3/36
[52] U.S. Cl. ........................................ 172/272; 172/683
[58] Field of Search .................................. 172/272, 681, 172/683

[56] References Cited

U.S. PATENT DOCUMENTS

| | | | |
|---|---|---|---|
| 3,550,691 | 12/1970 | Davies et al. | 172/699 |
| 3,659,654 | 5/1972 | Davies et al. | 172/699 |
| 3,750,761 | 8/1973 | Smith et al. | 172/719 |
| 4,219,947 | 9/1980 | Paladino | 37/193 |

*Primary Examiner*—Christopher J. Novosad
*Attorney, Agent, or Firm*—William C. Perry

[57] ABSTRACT

This invention provides a mounting arrangement for a ripper shank that is mounted in a channel defined in a ripper frame. A pair of piston members are mounted in the frame on opposite sides of the ripper shank. The piston members are urged into engagement with the ripper shank by a biasing mechanism that is positioned between the frame and the piston members. An actuating mechanism is mounted between the frame and the piston members to disengage the biasing mechanism to allow the adjustment of the ripper shank with respect to the frame in one of an infinite number of positions.

16 Claims, 4 Drawing Sheets

Fig_1_

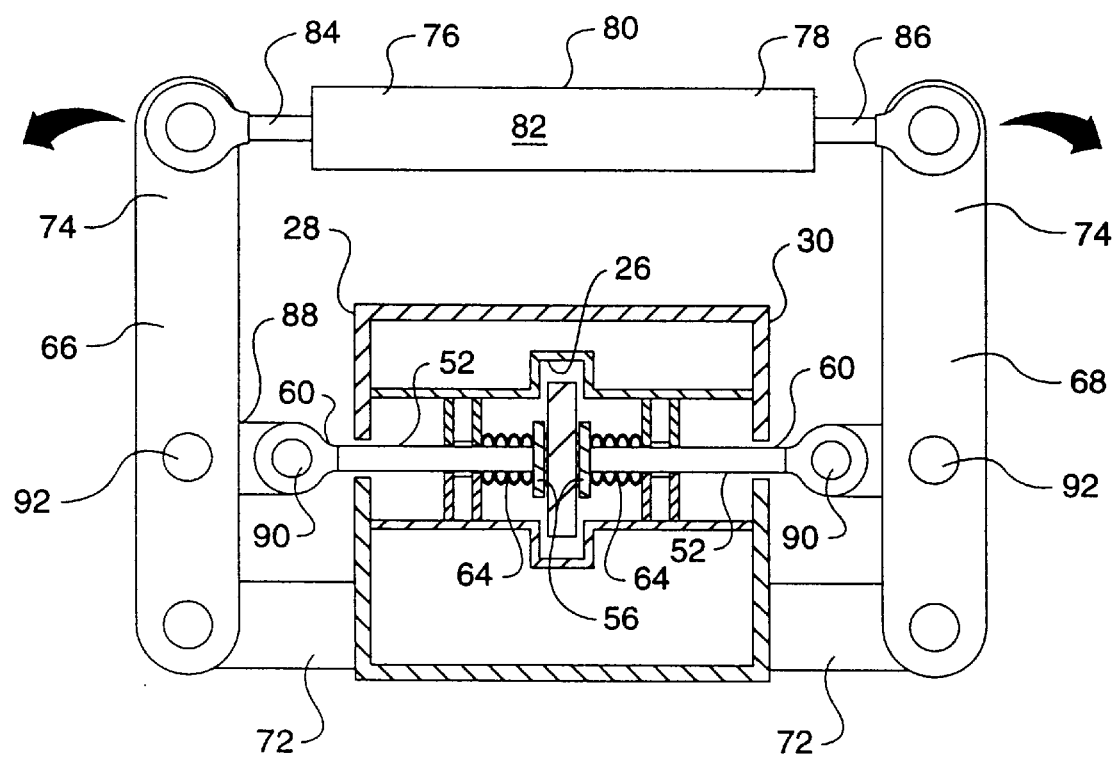
Fig_4_

MOUNTING ARRANGEMENT FOR A RIPPER SHANK

TECHNICAL FIELD

This invention pertains to a mounting for a ripper shank and more particularly to a mounting wherein the ripper shank may be secured in one of an infinite number of positions within a ripper frame.

BACKGROUND ART

In the operation of construction machinery, especially of the type known as track type tractors, it is a common practice to position an apparatus on the machine that will penetrate tough material and loosen it to aid its removal. This apparatus is commonly referred to as a ripper assembly. Typical ripper assemblies include one or more main beam members, referred to as a ripper shank, that are mounted within a framework that is raised and lowered under power to engage and penetrate the terrain. The ripper is then moved through the terrain as the machine is powered in a forward direction.

The position of the ripper shank within the ripper frame is vertically adjustable with respect thereto depending on the desired depth of penetration. The ripper is contained within a vertical pocket or channel that is slightly larger than the ripper shank to allow relative movement of the shank vertically within the channel. The ripper shank has a pin bore formed therein that is alignable with one or more bores formed in the ripper frame in a manner wherein a retention pin is positioned in the aligned bores to secure the position of the ripper shank. While this retention method is sufficient to secure the position of the ripper shank within the channel, the ripper shank is has been known to move, under the force of operation, within the channel. Since there is clearance between the channel and the shank, this movement has been known to cause rather severe wear and damage to the ripper frame.

In addition to the wear issue, adjustment of the position of the ripper shank has proven to be a challenge. Since the ripper is by necessity a very robust member, as is the ripper frame, the adjustment in position between these two components, when aligning the pin bores in the respective components, is fairly difficult. This process has been known to be time consuming and often requiring the services of more than one operator and/or service personnel In addition to the difficulty in pin alignment, the number of available pin locations is limited, thus limiting the variability in shank positions with respect to the ripper frame. Many times the set positions are not quite ideal for the intended usage. When this occurs, production potential is sacrificed.

In some mounting arrangements a two part mounting system is employed. One component of such a system engages one of a number of notches defined on the ripper shank to established the vertical positioning of the shank thus eliminating the need for a retention pin. The other component utilizes a wedge member that is hydraulically actuated, to prevent the relative movement between the ripper shank and the channel within which it is mounted. While this solves some of the problems set forth above, it does not do so while providing an infinitely adjustable mounting for the ripper shank.

The present invention is directed toward overcoming one or more of the problems set forth above.

DISCLOSURE OF THE INVENTION

In one aspect of the present invention a mounting arrangement for a ripper shank is provided. The mounting arrangement includes a ripper frame that has a channel formed therein that in turn, defines a pair of side walls. A ripper shank is positioned within and is adapted to move with respect to the channel. A first engagement assembly is mounted in the first side wall and is moveable between a first position wherein it is engaged with the ripper shank and a second position wherein it is disengaged from the ripper shank. A second engagement assembly is mounted in the second side wall and is moveable between a first position wherein it is engaged with the ripper shank and a second position wherein it is removed from engagement with the ripper shank. An actuating mechanism is provided that is operatively connected to the first and second engagement assemblies. The actuating mechanism is operable in a first condition wherein the respective engagement assemblies are simultaneously moved to their first position to fix the position of the ripper shank in one of an infinite number of locations with respect to the channel. Conversely, the actuating mechanism is also operable in a second condition wherein the engagement assemblies are simultaneously moved to their second position to permit relative movement between the ripper shank and the channel.

In another aspect of the present invention, a mounting apparatus is provided that includes a frame that has first and second sides and a channel defined therein that is spaced inwardly from the sides of the frame. A ripper shank is positioned in the channel for relative movement with respect thereto. A first bore is defined in the frame between the first side thereof and a first side wall of the channel. A first piston member is reciprocally mounted in the first bore and is operable between a first position wherein it is engaged with the ripper shank and a second position wherein it is removed from engagement with the ripper shank. A second bore is defined in the frame between the second side thereof and a second side wall of the channel. A second piston member is reciprocally mounted in the second bore and is operable between a first position wherein it is engaged with the ripper shank and a second position wherein it is removed from engagement with the ripper shank. A biasing mechanism is positioned between the respective sides of the frame and the first and second piston members to urge the piston members into engagement with opposing sides of the ripper shank. This allows the ripper shank to be positioned along the channel in any one of an infinite number of positions.

With a mounting arrangement as set forth above, the position of a ripper shank can be expeditiously adjusted from the cab of a machine in one of an infinite number of positions to obtain maximum productivity.

BRIEF DESCRIPTION OF THE DRAWINGS

FIG. 4 is a diagrammatic schematic representation of the mounting arrangement of the present invention.

BEST MODE FOR CARRYING OUT THE INVENTION

Figure 1:
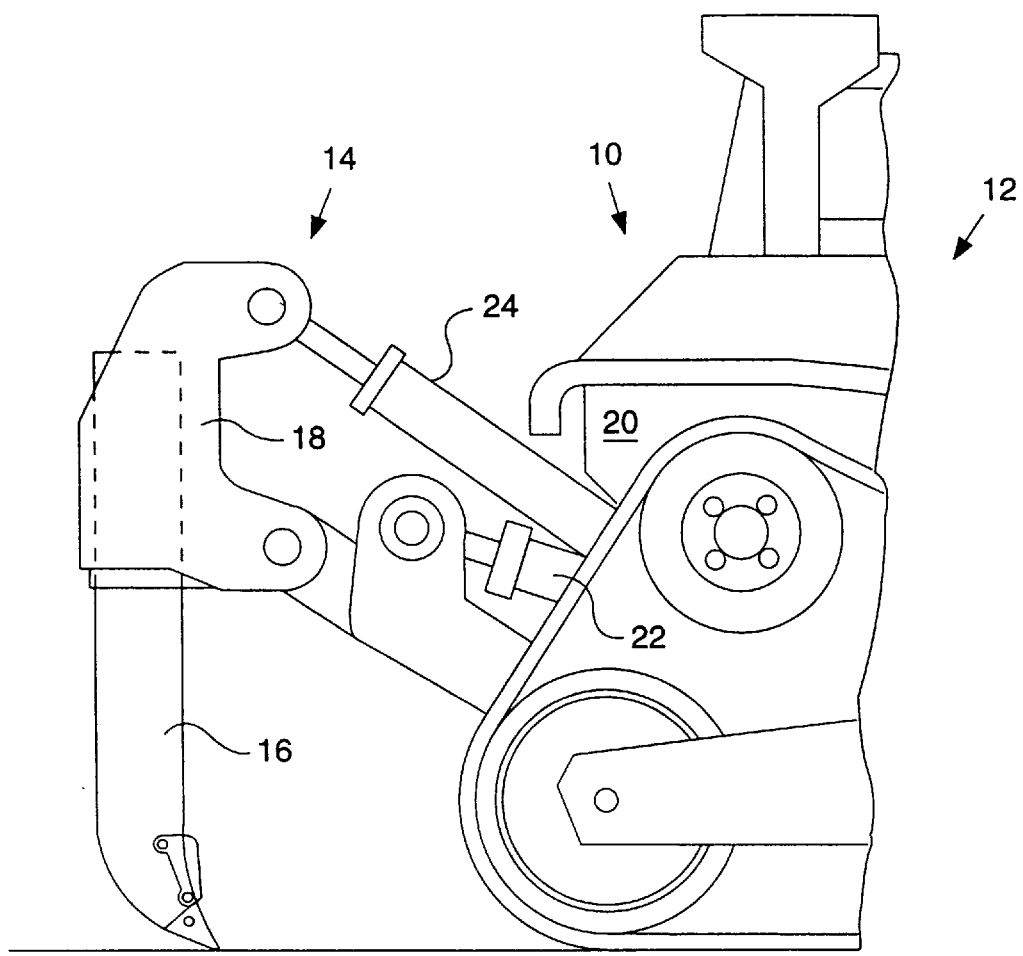
FIG. 1 is a diagrammatic side elevation view of a portion of a machine having a ripper assembly mounted thereon that embodies the principles of the present invention.

Referring now to FIG. 1, it can be seen that a rear portion 10 of a track type machine 12 (partially shown). The machine 12 has a ripper assembly 14 mounted on the rear portion thereof. The ripper assembly 14 has a ripper shank 16 that is mounted within a ripper frame 18. The frame is pivotally mounted to the rear frame 20 of the machine and is raised and lowered in a conventional manner by one or more hydraulic cylinders 22 that are mounted between the ripper frame and the machine frame. The attitude of the ripper shank is controlled by one or more hydraulic cylinders 24 that extend between the ripper frame and the machine frame. The ripper shank may be lowered to a point wherein at least a portion of the ripper shank is embedded in the ground to penetrate and break up the terrain as the machine is driven forward.

Figure 2:
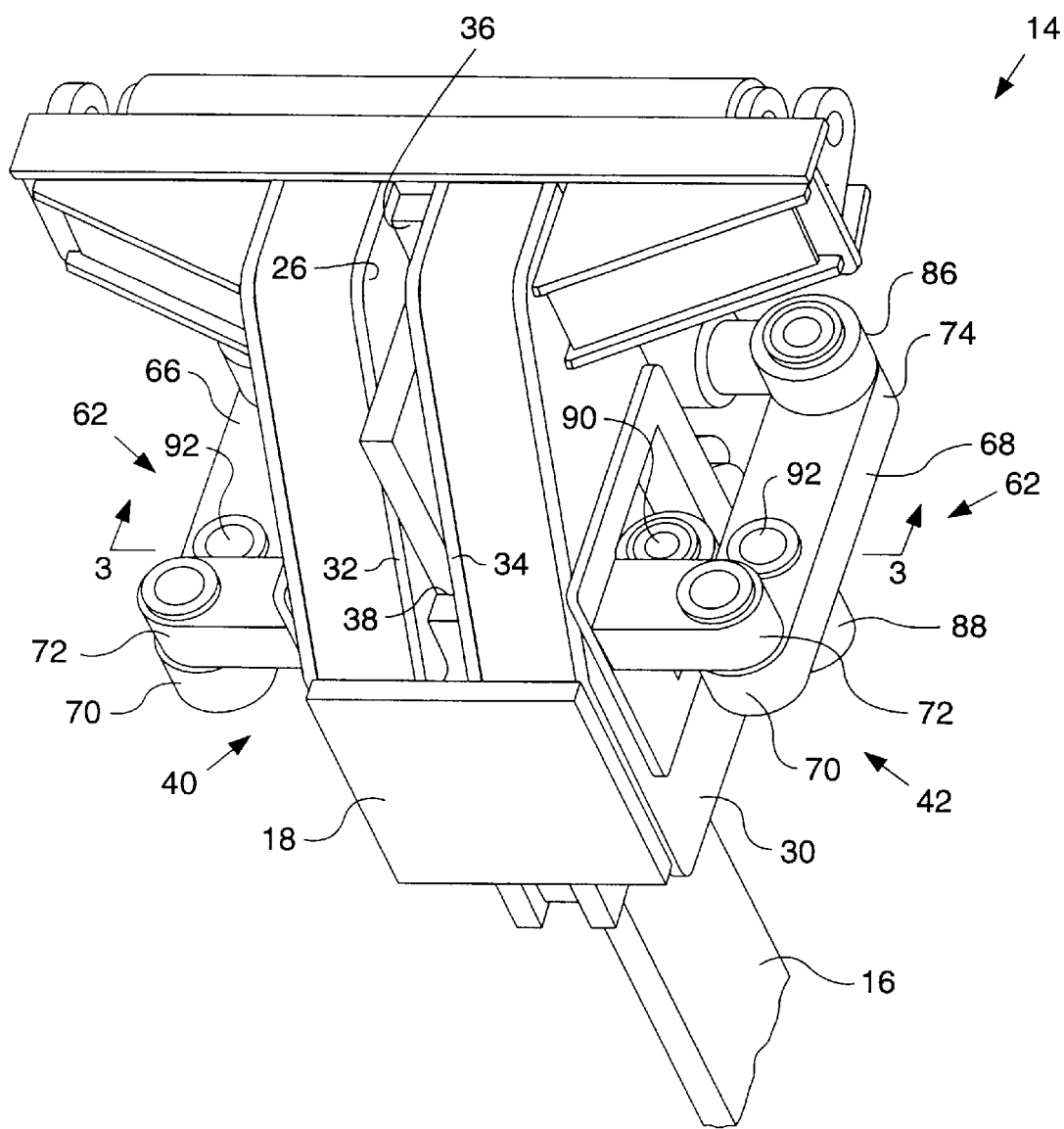
FIG. 2 is a diagrammatic perspective view of the ripper assembly as viewed from the rear of the machine shown in FIG. 1.
Figure 3:
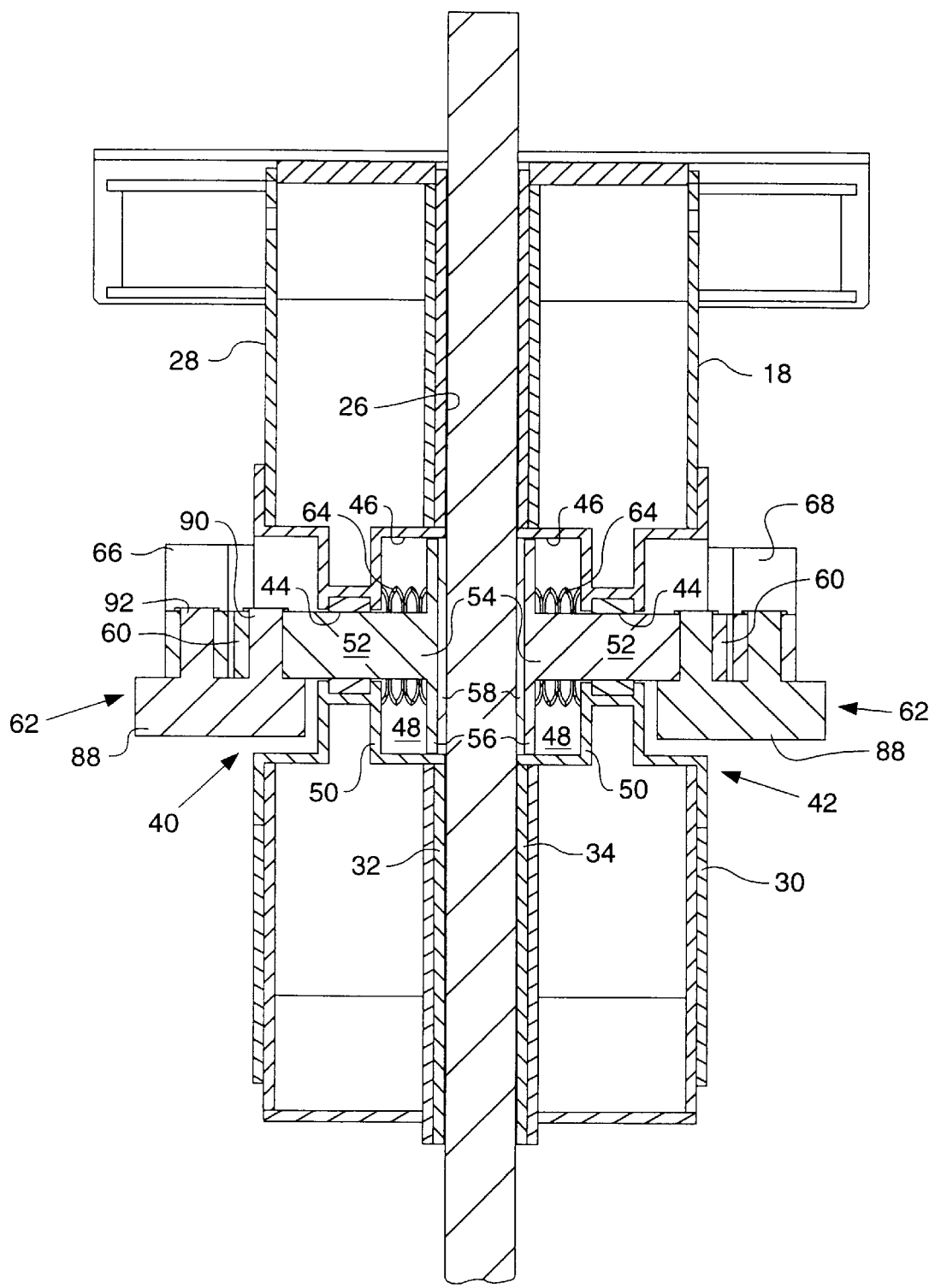
FIG. 3 is a diagrammatic section view taken along lines 22 of FIG. 2.

Referring to FIGS. 2 and 3, the ripper frame 18 can be seen in greater detail. The ripper frame 18 is comprised of a fabricated assembly that includes a centrally disposed pocket or channel 26 that is spaced inwardly from a pair of side 28 and 30 of the ripper frame. The channel is primarily defined by a pair of opposing side walls 32 and 34, a front wall 36 and a rear wall 38. The dimensions of the channel are slightly larger that the dimensions of the ripper shank 16 so the ripper shank may be received within the channel 26 for generally vertical movement therewithin.

The position of the ripper shank 16 within the channel 26 is fixed by first and second engagement assemblies 40 and 42. Each engagement assembly is essentially identical to one another and therefore it is to be understood that each reference numeral will refer to identical components in each assembly. The engagement assemblies are mounted in a pair of bores 44 that extend generally horizontally between the respective sides 28 and 30 of the frame 18 and the respective side walls 32 and 34 of the channel. Each bore 44 defines an enlarged counterbore 46 that opens onto the respective side walls 32 and 34 of the channel. The counterbore defines a recess 48 that terminates at a radially directed wall 50 that is spaced outwardly from and parallel to the side walls 32 and 34 of the channel.

Each engagement assembly 40 and 42 includes a piston member 52 that is positioned within each bore 44. Each piston member has a first end portion 54 that defines an enlarged head member 56 that is adapted for positioning within the recess 48 of the bore 44. The first end portion is comprised of a suitable type of friction material, or has a suitable type of friction material, preferably in the form of a disc, secured to an inner surface 58. The second end portion 60 of the respective piston members extends through the respective sides 28 and 30 of the frame 18. The second end portions 60 engage an actuating mechanism 62 in a manner that will be described in greater detail hereinafter.

The enlarged head member 56 of each piston member 52 are urged into engagement with the ripper shank 16 by a biasing mechanism 64. The biasing mechanism in the preferred embodiment includes a plurality of Bellville-type washers, or springs, that are compressed between the enlarged head of the piston and the radially directed wall 50. The biasing mechanism 64 is compressed to an extent that creates a continual force applied by the piston members to the ripper shank to secure the position of the ripper shank with respect to the ripper frame 18. While the present invention discloses a plurality of Bellville-type springs as the biasing mechanism, it is to be understood that other type of springs such as coil springs, compressed rubber or other elastomeric material, or any other suitable spring mechanism may be used without departing from the intent of the present invention.

The actuating mechanism 62 includes first and second actuating arms 66 and 68 that are pivotally mounted the opposing walls 28 and 30, respectively of the ripper frame 18. Each actuating arm has a first end portion 70 that is pivotally mounted to an ear 72 that extends from each of the sides 28 and 30 of the ripper frame. The actuating arms extend substantially in parallel orientation with respect to the sides of the frame and terminate in a second end portion 74. The second end portions 74 are pivotally mounted to opposing ends 76 and 78 of a fluid actuator 80, which in the instant embodiment is a hydraulic cylinder. The hydraulic cylinder defines a central body portion 82 and first and second rod ends 84 and 86 that extend from opposing ends of the central body portion 82. A tag link 88 is pivotally connected at a first end portion 90 thereof to the second end portion 60 of each piston 52. A second end portion 92 of each tag link is connected to each actuating arm 66 and 68 at a location that is intermediate the end portions 70 and 74 of each actuating arm. Being so connected, movement of the piston members 52 occurs simultaneously as a result of the movement of the hydraulic cylinder 80.

Industrial Applicability

In operation, the ripper assembly 14 is lowered to a point wherein the tip of the ripper shank 16 will engage the ground. Actuation of the cylinders 22 will force the ripper shank to penetrate the ground as the machine is driven forward to break up, or "rip" the ground to aid in its removal or manipulation.

There are certain conditions that require varying degrees of penetration of the ripper shank 16 in order to maximize the productive capabilities of the ripping operation. In order to change the amount of penetration of the ripper shank, the position of the ripper shank with respect to the frame assembly must be adjusted. In the present invention, the adjustment may be accomplished by the machine operator, from within the cab of the machine. With the tip of the ripper shank 16 resting on the ground, the operator may actuate the hydraulic cylinder 80 to extend the piston rod ends 84 and 86 from the central body 82. In doing so, the actuating arms 66 and 68 are pivoted away from the respective sides 28 and 30 of the frame 18. As the actuating arms pivot, the piston members 52 are simultaneously moved against the force of the biasing mechanism 64, out of engagement with the sides of the ripper shank 16. Once free of contact with the friction material of the pistons, the weight of the ripper shank will allow it to remain in contact with the ground while the ripper frame 18 is adjusted with respect to the ground via actuation of cylinders 22. Once the desired amount of relative movement has occurred between the ripper frame 18 and the ripper shank 16 to provide the desired amount of ground penetration, the hydraulic cylinder 80 may be actuated to allow the rod ends 84 and 86 to move toward the central body portion 82. This allows the actuating arms 66 and 68 to rotate back toward the sides 28 and 30, respectively, of the ripper frame 18. The biasing mechanism 64 will then force the piston members 52 into contact with the sides of the ripper shank 16 to fix the position of the ripper shank with respect to the channel 26. While the force exerted against the ripper shank by the biasing mechanism may be sufficient to fix the position of the ripper shank, forcible engagement of the piston members 52 with the ripper shank through their connection with the actuating arms and the actuation of hydraulic cylinder 80 is also contemplated. The springs would then provide a back up means that would secure the ripper shank in the event of a failure of the hydraulic system of the machine.

With a mounting arrangement as set forth above, the operating position of a ripper shank may be adjusted from the cab of the machine to which it is mounted. Since the engagement assemblies 40 and 42 that secure the ripper shank rely on friction engagement, the ripper may be positioned in any one of a substantially infinite number of positions. Also, since the mounting arrangement requires no pinned connections, the ripper shank does not require any machined bores making it a stronger structure that requires less machining and is therefore more cost effective to produce. Lastly, since there are no bores to align in which to insert a pin member, the entire procedure required to adjust the position of the ripper shank with respect to the frame is greatly simplified requiring only a single person. Since the actuation of the hydraulic cylinder is controlled from the operator station of the machine, total adjustment of the ripper shank may be done from the operating position.

Other aspects, objects and advantages can be obtained from a study of the drawings, the disclosure and the appended claims.

We claim:

1. A mounting arrangement for a ripper assembly, comprising:

a frame having a channel having first and second side walls defined therein;

a ripper shank positioned within the channel for relative movement therealong;

a first engagement assembly mounted in the first side wall and being moveable between a first position wherein it is engaged with the ripper shank and a second position wherein it is disengaged from the ripper shank;

a second engagement assembly mounted in the second side wall and being moveable between a first position wherein it is engaged with the ripper shank and a second position wherein it is removed from engagement with the ripper shank;

an actuating mechanism operatively connected to the first and second engagement assemblies and being operable between a first condition wherein the respective engagement assemblies are simultaneously moved to their first position to fix the position of the ripper shank in one of an infinite number of locations with respect to the channel and a second condition wherein the engagement assemblies are simultaneously moved to their second position to permit relative movement between the ripper shank and the channel.

2. The mounting arrangement as set forth in claim 1 wherein the first and second engagement assemblies are positioned within a pair of bores that extend between the respective first and second side walls of the channel and respective first and second sides of the frame, and are adapted for reciprocating movement within said bores.

3. The mounting arrangement as set forth in claim 2 wherein the engagement assemblies are defined by piston members, each having respective first end portions that define a friction surface and a second end portion that extends laterally from the frame.

4. The mounting arrangement as set forth in claim 3 wherein a biasing mechanism is positioned between the respective first and second sides of the frame and the respective first end portions of the first and second piston members to bias the respective piston members toward their first positions.

5. The mounting arrangement as set forth in claim 3 wherein the actuating mechanism further includes:

a first actuating arm having a first end portion pivotally mounted to the first side of the frame and a second end portion;

a first tag link having a first end portion connected to the second end portion of the first piston member and a second end portion pivotally connected to the first actuating arm at a location intermediate its end portions;

a second actuating arm having a first end portion pivotally mounted to the second side of the frame and a second end portion;

a second tag link having a first end portion connected to the second end portion of the second piston member and a second end portion pivotally connected to the second actuating arms at a location intermediate its end portions; and a fluid actuator connected between the opposing second end portions of the first and second actuating arms and being operable to pivot the actuating arms away from one another to move the engagement assemblies against the biasing mechanism to their second positions.

6. The mounting arrangement as set forth in claim 5 wherein the fluid actuator is a hydraulic cylinder having a central body portion and first and second cylinder rods extending from opposing end portions of the body portion, each cylinder rod being connected to an opposing one of the respective second end portions of the actuating arms, said respective cylinder rods being moveable away from the central body portion when the fluid actuator is in its second condition.

7. The mounting arrangement as set forth in claim 6 wherein the cylinder rods are moveable toward the body portion to move the respective actuating arms toward one another to move the piston members to their first positions.

8. A mounting arrangement having a frame having first and second sides and a channel defined therethrough in inwardly spaced relation to the respective frame sides and a ripper shank positioned in the channel for relative movement with respect thereto, comprising:

a first bore defined in the frame between the first side thereof and a first side wall of the channel;

a first piston member reciprocally mounted in the first bore and being operable between a first position wherein it is engaged with the ripper shank and a second position wherein it is removed from engagement with the ripper shank;

a second bore defined in the frame between the second side thereof and a second side wall of the channel;

a second piston member reciprocally mounted in the second bore and being operable between a first position wherein it is engaged with the ripper shank and a second position wherein it is removed from engagement with the ripper shank; and a biasing mechanism positioned between the respective sides of the frame and the first and second piston members to urge the piston members into engagement with opposing sides of the ripper shank to fix the position of the ripper shank with respect to the channel in one of a substantially infinite number of positions therealong.

9. The mounting arrangement as set forth in claim 8 wherein each piston member has a first end portion that has friction material mounted thereon that is adapted for engagement with the ripper shank and a second end portion that extends laterally from the respective first and second sides of the frame.

10. The mounting arrangement as set forth in claim 9 wherein the each of the first and second bores defined by the frame further define an enlarged counterbore that opens onto opposing side walls that define the channel, said counterbore terminating in a radially directed wall that is spaced inwardly from the opposing side walls of the channel a distance sufficient to define a recess that is adapted to receive the first end portions of the respective piston members therein.

11. The mounting arrangement as set forth in claim 10 wherein the biasing mechanism includes a plurality of Bellville-type springs that extend between the radial wall defined by the respective recesses and the first end portions of the respective piston members.

12. The mounting arrangement as set forth in claim 8 wherein a pair of actuating arms are pivotally mounted on opposite sides of the frame at respective first end portions thereof, and to the respective second end portions of the first and second piston members at a generally intermediate portion thereof, said actuating arms being moveable in a direction away from the frame to move the respective piston members simultaneously away from the shank member.

13. The mounting arrangement as set forth in claim 12 wherein each actuating arm has a second end portion that is mounted to an opposing ends of a fluid actuator, said fluid actuator being operable to move the actuating arms away from the frame to move the respective piston members in a direction against the bias of the springs.

14. The mounting arrangement as set forth in claim 13 wherein the fluid actuator is a double acting hydraulic cylinder that is adapted be pressurized to move the respective actuating arms in a direction away from the frame to disengage the piston members from contact with the ripper shank and in a direction that moves the actuating arms toward the frame to forcibly engage the piston members into contact with the ripper shank.

15. The mounting arrangement as set forth in claim 14 wherein the biasing mechanism will maintain the position of the ripper shank with respect to the channel in absence of the movement of the actuating arms toward the frame.

16. The mounting arrangement as set forth in claim 12 wherein a pair of tag links are provided between the second end portions of the first and second piston members and the respective actuating arms to provide a pivotal connection therebetween.

* * * * *